March 14, 1967   A. CHRISTENSEN   3,308,985
FLEXIBLE SEAL JOINT

Filed Nov. 21, 1963   3 Sheets-Sheet 1

AXEL CHRISTENSEN
INVENTOR.

BY *J. T. Chabot*

AGENT

AXEL CHRISTENSEN
INVENTOR.

AXEL CHRISTENSEN
INVENTOR.

United States Patent Office 3,308,985
Patented Mar. 14, 1967

3,308,985
FLEXIBLE SEAL JOINT
Axel Christensen, Stamford, Conn., assignor to Chemical Construction Corporation, New York, N.Y., a corporation of Delaware
Filed Nov. 21, 1963, Ser. No. 325,287
9 Claims. (Cl. 220—46)

The present invention relates to an improved seal joint for fluid retention at a closure joint subject to fluid leakage, such as a high pressure joint in which the fluid retention members are retained in position by a keyway. A flexible seal joint is provided, in which the ends of an arcuate seal ring are maintained in sealing relationship to recesses in the fluid retention members by compression of the ring. A continuous sealing action is obtained, which is free of the sliding friction of prior sealing arrangements.

Numerous devices have been proposed for the fluid sealing of joints between apparatus elements, such as the head cover and the body of a high pressure autoclave. When such apparatus units are of relatively large diameter, fluid sealing by means of a conventional gasketed closure between the cover and the body is no longer feasible, due to the necessity of providing oversized bolts which are subjected to high tensile stress. The gasketed area and flanges must be correspondingly enlarged, and the resulting assemblage is thus oversized and impractical.

Thus, it has been conventional practice to attach apparatus elements such as a large diameter cover to a pressure vessel body by means of a keyed or notched joint, which serves to retain the cover in position under pressure but does not act as a seal against fluid leakage around the edge of the joint. The sealing of the joint against fluid leakage is then attained by means of auxiliary sealing elements. Typical of the prior art arrangements for this purpose is the apparatus shown in U.S. Patent No. 2,857,142. In this apparatus, fluid sealing is attained by providing a U-shaped element which is clamped or forced across the joint. Sealing is attained by providing a gasket between the U-shaped element and the vessel surfaces adjacent to the joint. In this arrangement, relative movement of apparatus elements results in a sliding action of the vessel surface against the gasket, with attendant deformation and leakage in service.

In the present invention, a unique flexible sealing joint is provided which attains complete sealing action against fluid leakage from between adjacent fluid retention members, such as an autoclave body and cover. An arcuate seal ring is disposed over the joint, with the ends of the seal ring being disposed in opposed recesses in the fluid retention members. In general, the joint between the fluid retention members will be circular, as in the case of a circular cover disposed over a circular opening in an autoclave body. A circular gasket is provided between each end of the seal ring and the respective recess in a fluid retention member. Means are provided for compressing or forcing the ring towards the joint, so that the ring is somewhat flattened and its ends are forced into the recesses, thus compressing the gaskets and providing a sealing action. When there is relative movement of the joint, such as when the joint opens slightly due to elevated pressure within the autoclave, the seal ring flattens out further due to compression and provides a constant seal by pressure against the gaskets. This sealing action is maintained without any sliding friction, instead in effect the ends of the seal ring merely pivot about the gaskets to provide continuous sealing.

The means provided for continuous compression of the ring are also unique, in that a cylindrical compression ring is pivoted and forced against the center of the outer arcuate surface of the seal ring by a flange ring which in turn is pressed against the compression ring by a plurality of elongated tension bolts which are attached to the fluid retention members. The bolts are maintained in tension when the seal ring flattens, preferably by means of sleeves which extend between the heads of the bolts and the upper surface of the flange ring. Thus, continuous pressure is maintained on the seal ring with concomitant sealing, regardless of displacement or deformation of the seal ring.

A primary advantage of the apparatus of the present invention is that the arcuate seal ring deforms in proportion to displacement of the fluid retention members. This is highly important because continuous sealing is attained without sliding friction. Thus, deformation of gaskets, or leakage due to scratching or tearing of surfaces, etc., is avoided. Since the seal ring deforms in service when relative displacement of the fluid retention members takes place, the ends of the seal ring pivot in their respective recesses, and in effect each end of the seal ring pivots about a gasket thus providing continuous contact and sealing without any sliding action. The apparatus combination involving the provision of elongated tension bolts is also highly advantageous, since the bolts in effect act as tension springs and maintain continuous pressure on the arcuate seal ring when the seal ring becomes deformed and flattened out due to displacement of the fluid retention members.

It is an object of the present invention to provide an improved sealing apparatus for joints between fluid retention members.

Another object is to provide a flexible seal joint for high pressure closures.

An additional object is to provide a seal joint which is free of sliding friction between surfaces, when the joint deforms in service.

A further object is to provide a seal joint in which pivoted closure against fluid leakage is attained.

Still another object is to provide a sealing apparatus combination in which continuous pressure is maintained against an arcuate sealing ring, when the ring deforms in service.

These and other objects and advantages of the present invention will become evident from the description which follows. The flexible sealing joint of the present invention will be described in relation to usage for sealing at the closure between an autoclave body and cover, however numerous other application of the apparatus of the present invention will occur to those skilled in the art.

Referring to the figures.

Figure 1:
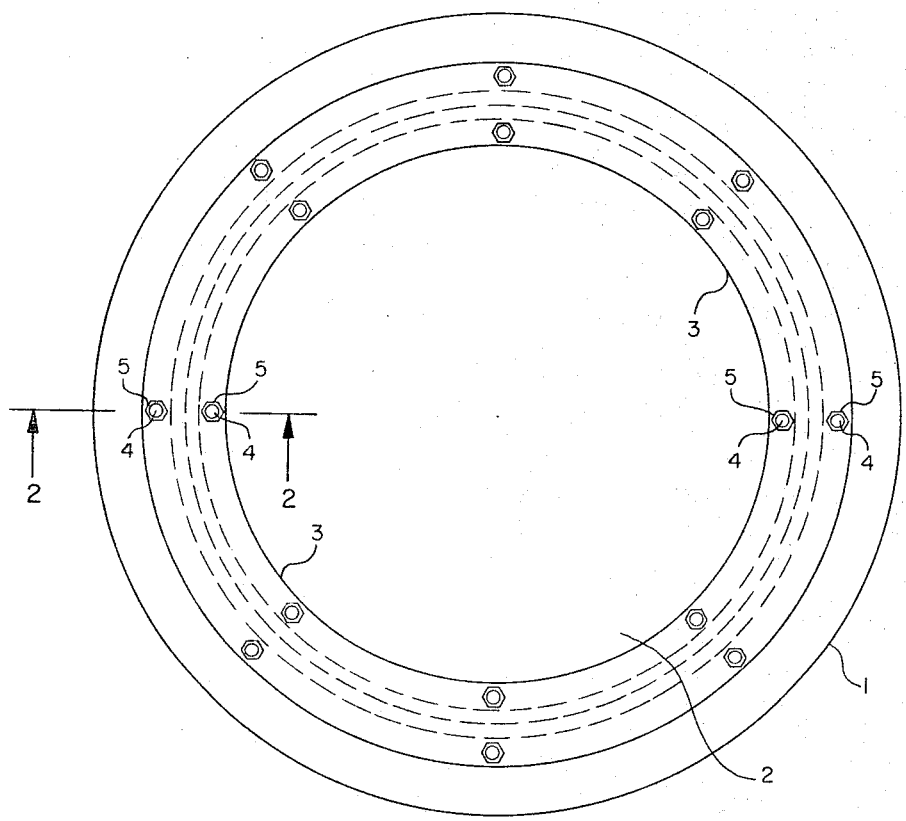
FIGURE 1 is a plan view of the apparatus as applied to the circular closure between an autoclave body and a horizontal circular cover plate.

Referring now to FIGURE 1, the general perspective of the apparatus is shown, without provision of extensive details as to the flexible sealing joint. Thus, vessel body 1 is provided with upper circular cover 2, which is a flat disc covering an upper circular opening in the top of vessel body 1. Cover 2 is attached to body 1 by a conventional keyway or slotted joint, not shown in FIG. 1, by means of which the cover 2 is restrained against movement when internal pressure or vacuum is provided inside vessel body 1. The closure cover 2 is thus not directly sealed against vessel body 1 so as to prevent fluid leakage, but instead is merely retained in position by a keyway or other means.

Circular flange ring 3 extends over the sealing joint, and is attached to elements 1 and 2 by a plurality of bolts 4 having terminal nuts 5 which provide tension in the bolts 4, thus acting to press the flange ring 3 downwards against the sealing joint.

Figure 2:
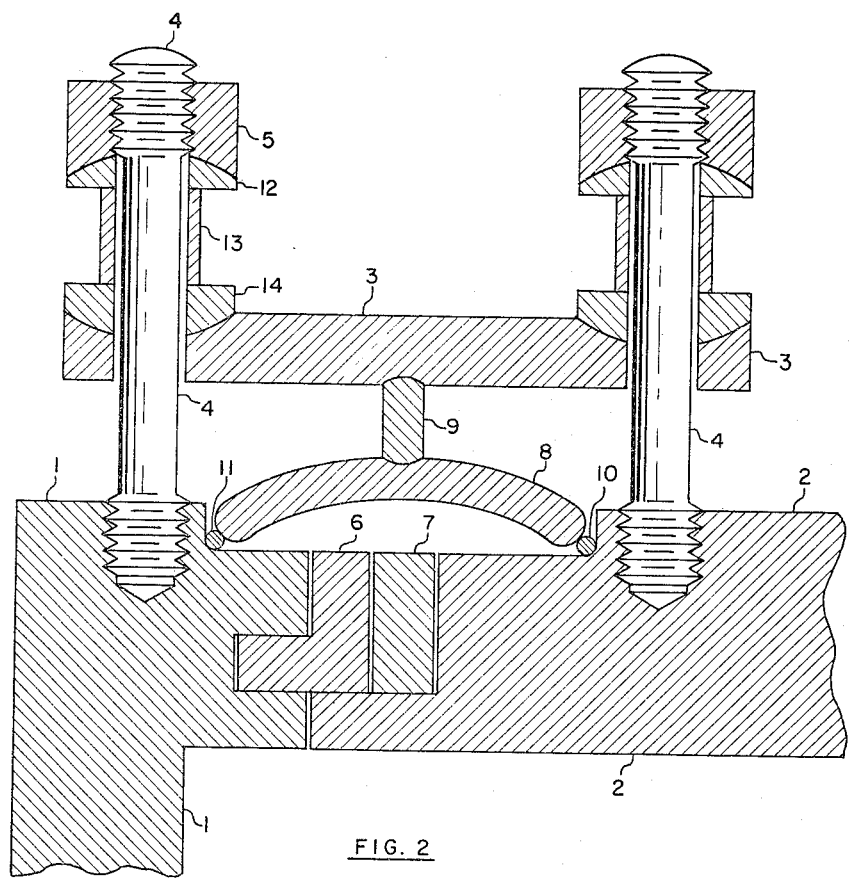
FIGURE 2 is a sectional elevation view of FIGURE 1, taken on section 2—2, and shown in larger scale.

Referring now to FIGURE 2, which is a sectional elevation view of FIG. 1 taken on section 2–2 and shown in larger scale, full details of the flexible sealing joint of the present invention are evident. The vessel cover 2 is secured to vessel body 1 by means of split ring 6, which is inserted into the lower recess in the vessel body in sections, and retained in position by solid ring 7. Thus, the vessel cover 2 is restrained against upward movement when elevated pressure is maintained inside vessel 1. It will be evident that rings 6 and 7 do not provide a seal against fluid leakage, but merely retain cover 2 in position. Other equivalent means for retaining cover 2, such as a keyway or slotted joint, may be employed instead of rings 6 and 7.

The arcuate seal ring 8 serves to provide a fluid retention sealing effect. Element 8 is an arcuate or bowed unit which is subject to bending or flattening by cylindrical compression ring 9, which acts downward against the center of ring 8, preferably with a pivoted or curved contact so that compression is uniformly maintained when ring 8 distorts laterally. The force exerted by compression ring 9 against arcuate seal ring 8 serves to force the ends of ring 8 downwards and outwards against inner and outer circular gaskets 10 and 11. Gasket 10 preferably has a round cross-section, and is disposed in a curved recess in cover 2. Similarly, gasket 11 has a round cross-section and is disposed in a curved recess in vessel body 1. When the ends of ring 8 are forced against gaskets 10 and 11, sealing of the joint between cover 2 and body 1 against fluid leakage is attained. This sealing effect is continuously maintained when displacement occurs between vessel cover 2 and body 1. Thus, when elevated pressure is provided within vessel body 1, sideways or lateral movement of body 1 relative to cover 2 will take place. The dimension between the recesses in cover 2 and body 1 will increase. Due to the compressive force applied by ring 9, the seal ring 8 will flatten out in proportion, with the ends of ring 8 pivoting against gaskets 10 and 11. In this manner, a continuous seal is maintained, without sliding friction against the gaskets 10 and 11. Thus, the structural integrity of the gaskets is maintained in service.

Numerous means may be provided in practice for the continuous compression of ring 8, or for forcing ring 9 downwards against ring 8. A preferred and unique apparatus assemblage for this purpose is also shown in FIGURE 2. Compression ring 9 is forced downwards by flat flange ring 3, which in turn is maintained under downward stress by a plurality of tension bolts 4 which are attached to cover 2 and vessel body 1. The bolts 4 are maintained under continuous tensile stress by terminal nuts 5, which exert a downwards force against upper washers 12 which are preferably provided with an upwardly curved upper surface in order to obtain uniform compression. Opposed curved recesses are provided in nuts 5. Washers 12 in turn act against annular sleeves 13, which exert a downwards force against lower washers 14 which are preferably provided with a downwardly curved lower surface in order to obtain uniform compression. Opposed curved recesses are provided in the surface of ring 3. Clearance is provided between each tension bolt 4 and the respective upper and lower washers, sleeve and hole in flange 3. In this manner, provision is made for lateral movement of bolts 4, which takes place when body 1 moves sideways relative to cover 2 under elevated pressure. The provision of curvature on the faces of washers 12 and 14 insures the maintenance of uniform surface pressure when the bolts are laterally displaced, since the entire assemblage of washers and opposed recesses will serve to automatically compensate for an angular change in the axis of bolts 4 due to lateral movement of the lower ends of the bolts.

Figure 3:
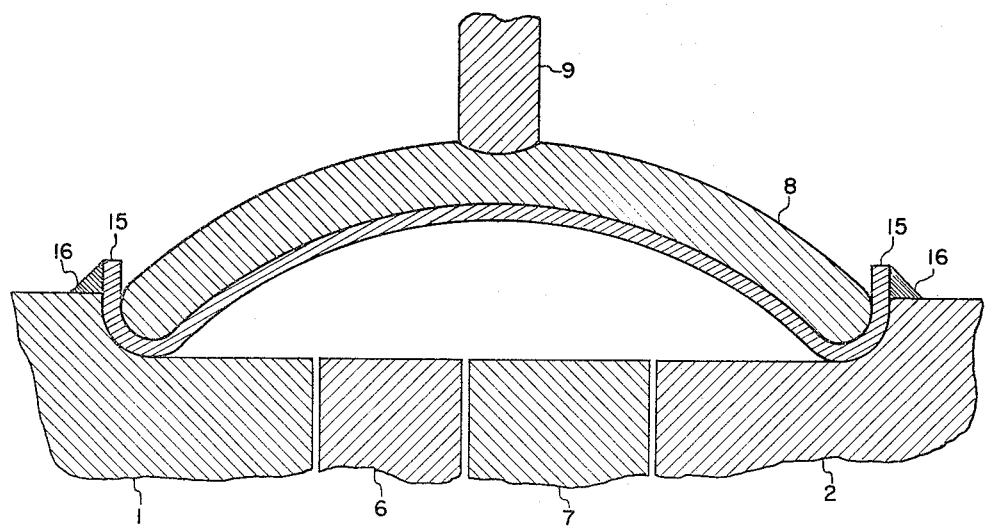
FIGURE 3 illustrates an alternative sealing arrangement within the scope of the present invention.

Numerous alternatives within the scope of the present invention will occur to those skilled in the art. One modification which would be feasible in instances where relatively large displacement of the fluid retention members takes place under pressure is shown in FIGURE 3. In this case the gaskets 10 and 11 are replaced by a continuous flexible membrane 15, which is preferably back-welded with seal welds 16. The membrane 15 is pressed against the curved recesses in stress bearing parts 1 and 2 by arcuate seal ring 8, and the weld joint 16 provides a fluid seal and is not stress bearing. The contact surface between ring 8 and membrane 15 has a circular cross-section, so that ring 8 rotates on membrane 15 during relative movement of parts 1 and 2, and maintains the sealing surfaces of membrane 15 on the recesses in parts 1 and 2 in unchanged position. With a closely fitted point, there is no need for welds 16, however the welds 16 provide added sealing in cases where the sealing surfaces between membrane 15 and the recesses in parts 1 and 2 become defective.

Other alternatives within the scope of the present invention may be mentioned. Thus, compression of arcuate seal ring 8 may alternatively be attained by spring loading, or the provision of weighted elements which continuously bear against ring 8. The gaskets 10 and 11 may alternatively be triangular in cross-section, in which case the recesses in parts 1 and 2 would be angular with one angle of the gaskets fitting in the angular recesses, so as to present flat gasket surfaces against the ends of ring 8.

It will be evident that in some instances a relatively minor lateral movement of part 1 with respect to part 2 may take place in service. In this case, the concomitant flattening of ring 8 may be of a small magnitude, and thus a minor downwards movement of flange ring 3 will take place. In this case, flange ring 3 may be directly attached to parts 1 and 2 by tension bolts 4, without the provision of extension sleeves 13 and washers 12 and 14. In most cases however, sleeves 13 will be necessary in order to provide elongated bolts 4 with concomitant maintenance of tension against flange ring 3, regardless of displacement of flange ring 3 due to flattening of ring 8.

Figure 4:
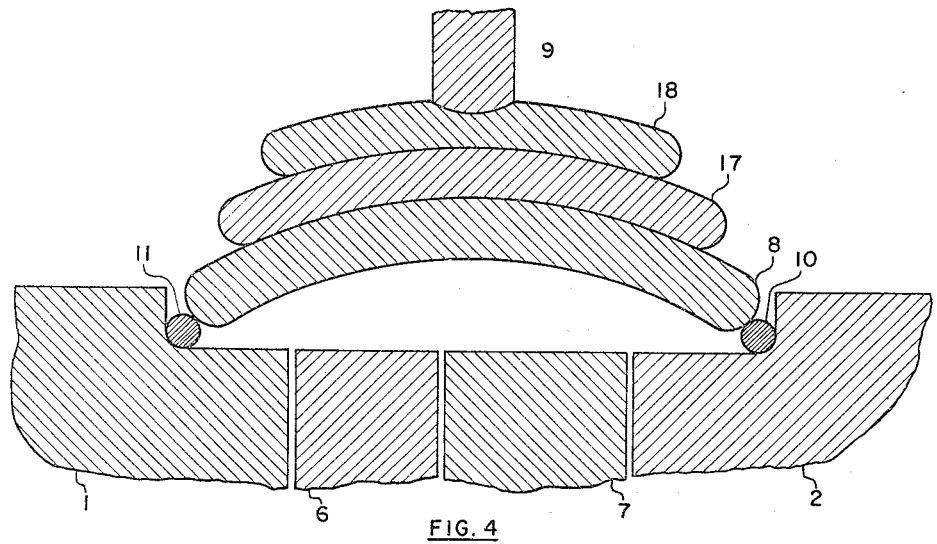
FIGURE 4 shows an alternative form of sealing ring.

Finally, in some cases the displacement or flattening of seal ring 8 is relatively great, due to a large relative movement of parts 1 and 2. Thus, it may be desirable to increase the flexibility of seal ring 8, while still maintaining structural strength of the ring under stress. This result may be attained by providing a laminated seal ring consisting of a plurality of separate rings in layers, as illustrated in FIGURE 4. In this case, supplementary rings 17 and 18 are provided between the main arcuate sealing ring 8 and the cylindrical compression ring 9. The main ring 8 may thus be made relatively thinner and more flexible, with stresses being distributed by rings 17 and 18. When ring 8 deforms and flattens due to relative movement of parts 1 and 2, sliding motion takes place between the several rings 8, 17 and 18 so as to accommodate for the deformation of ring 8, in the manner of a leaf spring. The stress due to the downwards pressure of ring 9 is thus distributed across the surface of ring 8 by rings 17 and 18, with concomitant pressure of the ends of ring 8 against the gaskets 10 and 11.

I claim:

1. A fluid sealing joint between juxtaposed fluid retention members in circular contact which comprises an arcuate seal ring, said seal ring extending between opposed recesses in said fluid retention members, circular gaskets between each end of said seal ring and the respective recess in a fluid retention member, a cylindrical compression ring above said seal ring, said compression ring being centrally disposed in contact with the outer arcuate surface of said seal ring and being pivoted so as to continuously exert pressure on the center of the arc of said seal ring when the curvature of said seal ring is reduced under compression, a flange ring above said compression ring, and a plurality of bolts extending between said flange ring and said fluid retention members, whereby said flange ring is maintained in compressive contact with said compression ring.

2. A fluid sealing joint between juxtaposed fluid retention members in circular contact which comprises an arcuate seal ring provided with rounded ends, said seal ring extending between opposed recesses in said fluid retention members, circular gaskets between each end of said seal ring and the respective recess in a fluid retention member, a cylindrical compression ring above said ring, said compression ring being centrally disposed in contact with the outer arcuate surface of said seal ring and being pivoted so as to continuously exert pressure on the center of the arc of said seal ring when the curvature of said seal ring is reduced under compression, a flange ring above said compression ring, a plurality of bolts extending through holes in said flange ring, the lower ends of said bolts being attached at their lower ends of said fluid retention members, tension nuts at the upper ends of said bolts, and sleeves external to said bolts, said sleeves extending between said nuts and the upper surface of said flange ring, the inner diameters of said sleeves and the holes in said flange ring being substantially greater than the diameter of said bolts whereby clearance for lateral movement of said bolts is provided.

3. Apparatus of claim 2, in which washers having upper faces which are curved upwards are provided between said sleeves and said tension nuts, with opposed curved recesses being provided in the lower faces of said tension nuts.

4. Apparatus of claim 2, in which washers having lower faces which are curved downwards are provided between said sleeves and the upper surface of said flange ring, with opposed curved recesses being provided in the upper surface of said flange ring.

5. Apparatus of claim 2, in which said juxtaposed fluid retention members are maintained in circular contact by a split ring, said split ring being disposed in a recess between said members.

6. Apparatus of claim 2, in which said opposed recesses are angular, and said gaskets have a substantially triangular cross-section, with one angle of each of said gaskets extending into an angular recess.

7. Apparatus of claim 2, in which said recesses are curved and said gaskets have a substantially round cross-section.

8. Apparatus of claim 2, in which at least one other arcuate ring is provided above and parallel to said seal ring and below said compression ring, said other ring being in the form of a lamination relative to said seal ring, whereby stresses due to pressure exerted by said compression ring are uniformly distributed to said seal ring and said seal ring has relatively increased flexibility.

9. A fluid sealing joint between juxtaposed fluid retention members in circular contact which comprises an arcuate seal ring, said seal ring extending between opposed recesses in said fluid retention members, circular gaskets between each end of said seal ring and the respective recess in a fluid retention member, at least one other arcuate ring, said other ring being above and parallel to said seal ring and in the form of a lamination relative to said seal ring, whereby stresses are uniformly distributed to said seal ring and said seal ring has relatively increased flexibility, a cylindrical compression ring, said compression ring being disposed in contact with the center of the outer arcuate surface of said other arcuate ring and being pivoted so as to continuously exert pressure on the center of the arc of said other arcuate ring, and means to maintain said compression ring under compression, whereby sealing against liquid leakage between said adjacent fluid retention members is continuously maintained when relative movement occurs between said fluid retention members.

References Cited by the Examiner

UNITED STATES PATENTS

| 2,226,495 | 12/1940 | Jacocks | 220—46 |
| 2,726,006 | 12/1955 | Brewer | 220—46 X |
| 2,857,142 | 10/1958 | Gertzon | 220—46 X |
| 2,989,209 | 6/1961 | Hersman | 220—46 |
| 3,161,317 | 12/1964 | Johanson | 220—46 X |

FOREIGN PATENTS 743,881   1/1956   Great Britain.

THERON E. CONDON, *Primary Examiner.*

GEORGE E. LOWRANCE, *Examiner.*